350-311
SR
1/6/87 OR 4,634,224

United States Patent [19]
Fischer

[11] Patent Number: 4,634,224
[45] Date of Patent: Jan. 6, 1987

[54] LOW-LOSS CORRECTION FILTER FOR MANUFACTURING THE PHOSPHOR SCREENS OF COLOR PICTURE TUBES

[75] Inventor: Bruno Fischer, Esslingen, Fed. Rep. of Germany

[73] Assignee: International Standard Electric Corporation, New York, N.Y.

[21] Appl. No.: 544,827

[22] Filed: Oct. 24, 1983

[30] Foreign Application Priority Data

Oct. 26, 1982 [DE] Fed. Rep. of Germany ....... 3239559

[51] Int. Cl.[4] .............................................. G02B 5/26
[52] U.S. Cl. .................................. 350/311; 350/164; 354/1
[58] Field of Search ............... 350/311, 319, 164, 166; 354/1

[56] References Cited

U.S. PATENT DOCUMENTS

| | | | |
|---|---|---|---|
| 2,999,034 | 9/1961 | Heidenhain | 350/164 |
| 3,463,574 | 8/1969 | Bastien et al. | 350/164 |
| 3,528,725 | 9/1970 | Barkley | 350/311 |
| 4,004,851 | 1/1977 | Negishi et al. | 350/311 |
| 4,157,215 | 6/1979 | Hanak | 354/1 |
| 4,313,648 | 2/1982 | Yano et al. | 350/166 |

*Primary Examiner*—John K. Corbin
*Assistant Examiner*—Loha Ben
*Attorney, Agent, or Firm*—Donald J. Lenkszus

[57] ABSTRACT

The correction filters which are used in manufacturing the structure of phosphor areas on the screens of color picture tubes are made more effective by being silvered or aluminized and provided with optical antireflection coatings. Owing to the resulting reduction of both the exposing and the cooling times, the number of light-houses required for a certain production volume can likewise be reduced.

10 Claims, 15 Drawing Figures

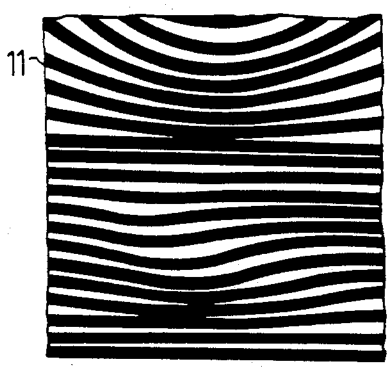
Fig.2
Fig.3
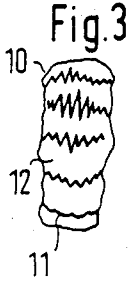
Fig.4
Fig.5
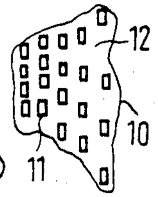
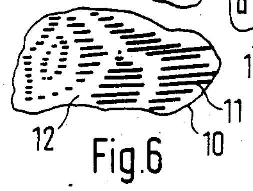
Fig.6
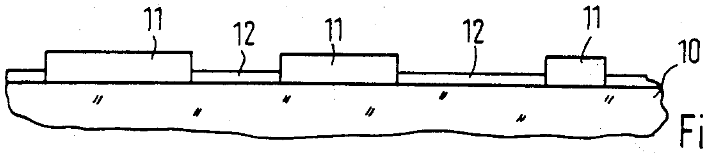
Fig.7
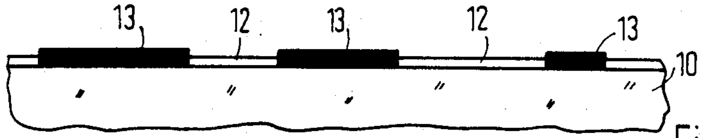
Fig.8
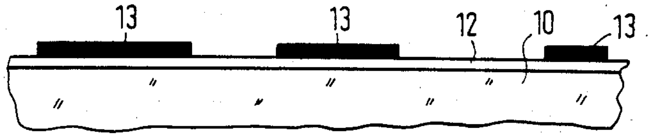
Fig.9
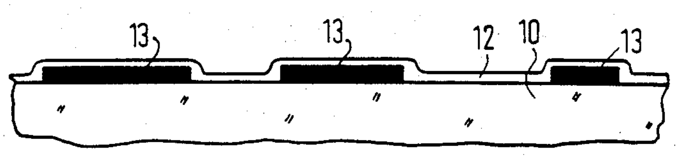
Fig.10
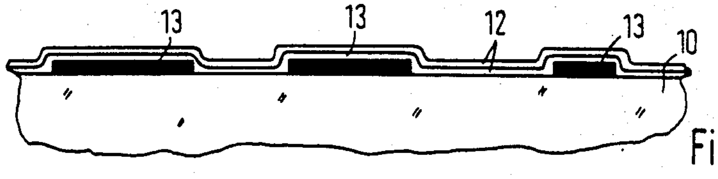
Fig.11

LOW-LOSS CORRECTION FILTER FOR MANUFACTURING THE PHOSPHOR SCREENS OF COLOR PICTURE TUBES

The invention relates to a correction filter of the type as set forth in the preamble of claim 1. It is used in a lighthouse which serves to manufacture phosphor screens for color picture tubes. In the course of this, a phosphor layer equally distributed on the faceplate of a color picture tube, is irradiated through a shadow mask, with this initiating a chemical reaction leading to the adherence of the phosphor elements struck by the radiation, on the faceplate.

In order to position the phosphor elements where they can be struck by the electrons passing through the apertures of the shadow mask during operation of the tube, the exposure is additionally effected through a lens simulating the beam path to the trajectories of the electrons as occurring in the finished color picture tube.

Moreover, in order to influence the width distribution of the phosphor elements, a correction filter is inserted into the beam path which weakens the beams in dependence upon the location.

A conventional type of correction filter consists of a more or less strong accumulation of soot particles which, solidified with the aid of gelatine, is deposited in the form of a layer on to the lens. This layer of soot and gelatine causes a location-dependent weakening of the radiation passing therethrough, and may be deposited either on to the lens itself or, for example, on to a separate glassplate serving as the base.

Other conventional types of correction filters, for achieving the location-dependent weakening of the radiation, employ as a barrier layer thin nickel stripes arranged at different mutually spaced relations in order thus to obtain the desired location dependence of the weakened radiation. The latter type of correction filter is more robust in use and more easy to maintain. The most significant disadvantages of the conventional filters are to be seen in the fact that also the transmissive surfaces still reflect a portion of the radiation, and that such conventional types of correction filters become heated by the radiation absorption in the barrier layer.

It is the object of the invention to reduce the reflection within the area of the transmissive layer and to reduce the warming-up of the correction filter.

The basic idea of the invention resides in the fact that the pass layer is provided with an optical antireflection coating and that the reflectance of the barrier layer is increased like in the case of a cold-light reflector. The selection of the wave bands in which the optical antireflection coating is applied or the reflectance is increased, depends on the spectral efficiency of the partial areas of the entire spectrum used for irradiation, upon the phosphor layer. That particular portion of the radiation spectrum which is ineffective at the initiation of the chemical reaction, may be permitted to pass through the correction filter, but may not be absorbed. With respect to this particular spectral region the barrier layer may be transmissive and the pass layer may be reflective.

The invention will now be explained with reference to FIGS. 1 to 15 of the accompanying drawings, in which:

FIG. 2 shows the section of a correction filter with the stripe pattern,

Figure 13:
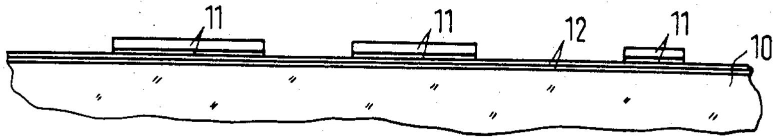
Figure 14:
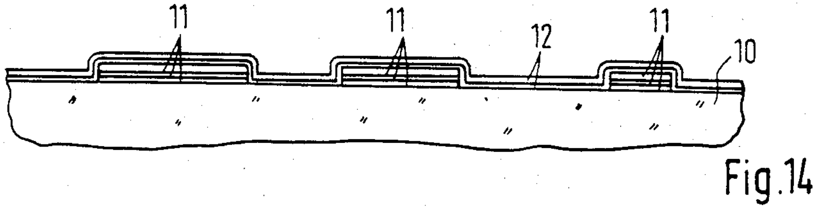
Figure 15:
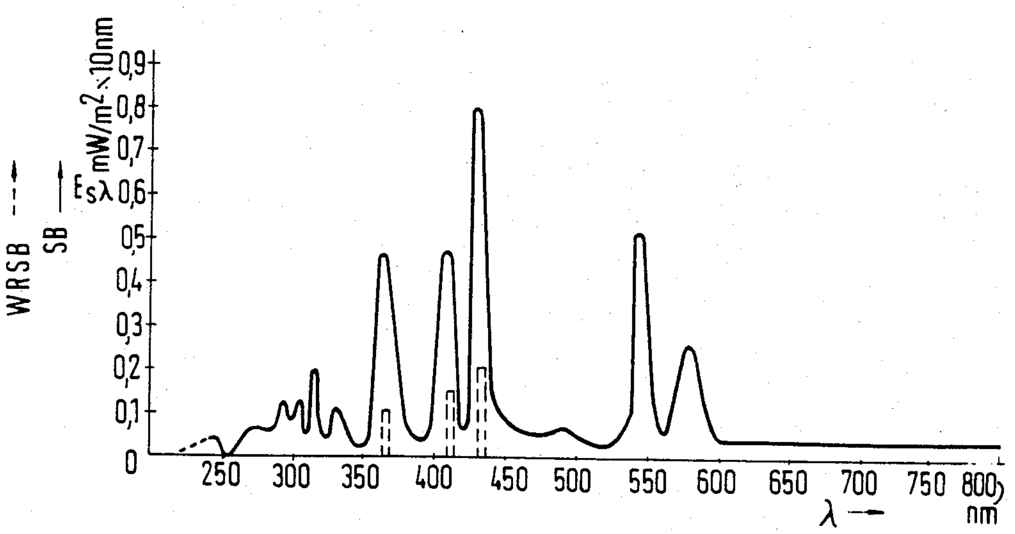

FIGS. 3 to 6 show further sections with other patterns relating to the types of embodiment of the correction filter, FIGS. 7 to 14 show sections relating to the cross section of various types of embodiment of the correction filter according to the invention, and FIG. 15 shows a diagram relating to the spectral irradiance SB and the effective relative spectral irradiance WRSB plotted over the wave length $\lambda$ referred to an illuminance of 1 lux=$lm/m^2$.

Figure 1:
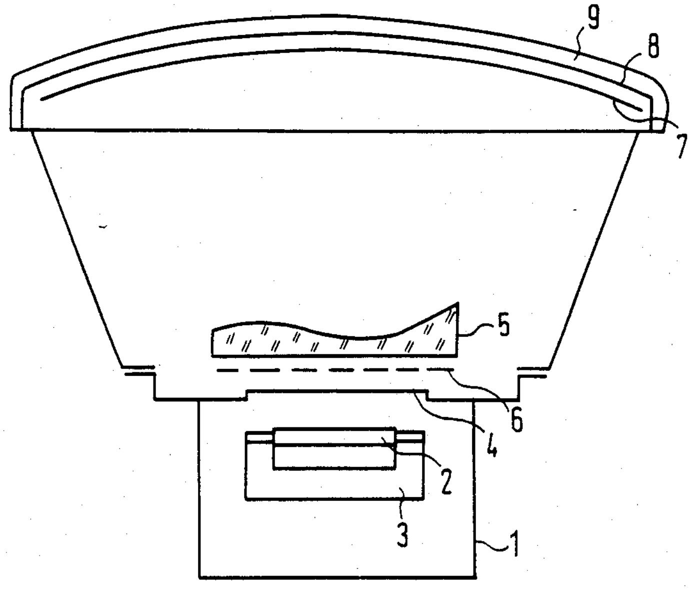
FIG. 1 shows an irradiation device (lighthouse)

FIG. 1 schematically shows a section taken through a lighthouse. Inside the lamp cap 1 a light source 2 is secured in the holder 3. The light from the light source passes through the window 4 and the correction filter 6 to the lens 5 which, as a rule, has one concavely and convexly worked side and one plane side. The shape of the lens causes on the phosphor layer of the phosphor screen 8, which is carried by the faceplate 9, at some points an intensified and at other points a weakened irradiation. This is unavoidable, because the lens must influence the beams in such a way that they, in the direction of the electron beams as employed with the finished tube, pass through the shadow mask 7, that is, that they simulate the electron path. The differences in illuminance occurring in the course of this, must be compensated for by the correction filter. In some types of lighthouses, the correction filter is arranged directly on the lens 5.

A section of the conventional type of correction filter with a stripe pattern is shown in FIG. 2. The invention, however, can also be applied to any other pattern, for example, to such patterns as shown in FIGS. 3 to 6.

FIG. 7 shows part of the cross section taken through a correction filter. According to the invention the layer 12 reducing the radiation reflection, is arranged on the base 10 which may be identical with the lens 5, and between the barrier layers 11. Both of these layers 12 are made of a material permitting the passage of radiation, but the layer thicknesses are so dimensioned that the optical adaptation to the base 10 within the area of the layers 12 is improved as far as possible, whereas within the areas of the layers 11, and in order to effect a reflection by way of mismatch, the adaptation or matching is reduced as far as possible.

FIG. 8, as compared to FIG. 7, shows a correction filter comprising barrier layers made of a material prohibiting the passage of radiation, with these barrier layers being referred to as shieldings 13. These, for example, may be conventional types of nickel stripes which are strongly reflective. The reference numeral 10 again indicates the base and 12 indicates a layer reducing the radiation reflection.

FIG. 9 shows a structure of the correction filter which is of particular advantage to the manufacture, and in which the layer 12 reducing the radiation reflection, is deposited continuously. The shielding 13 is deposited on to this layer, and the reference numeral 10 indicates the base.

FIG. 10 shows an example of the correction filter with a layer sequence which is inverted in comparison to that as shown in FIG. 9. On the base 10 there is arranged the shielding 13 and thereon the layer 12 reducing the radiation reflection.

The correction filter as shown in FIG. 11, on principle, corresponds to the one as shown in FIG. 10, with the exception that it comprises a multi-coat layer 12. The individual coatings of the layer 12, in their thicknesses and material properties which are determinative of the refractive index, are so designed that the transmittance, in dependence upon the wavelength, is adapated to the spectrum of the lightsource and to the spectral sensitivity of the phosphor layer. The reference numeral 10 indicates the base and the reference numeral 13 indicates the shielding.

Figure 12:
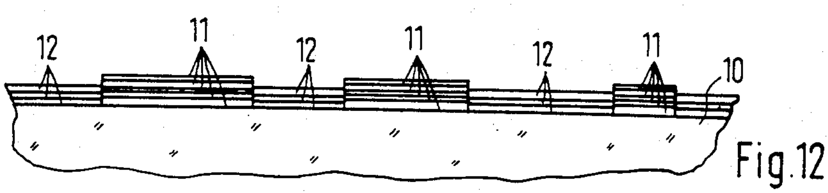

The arrangement as shown in FIG. 12 only differs from the arrangement as shown in FIG. 7, in that the layers 11 and 12 are multi-coating layers, with this permitting an improved optical adaptation (matching) compared to the correction filter as shown in FIG. 7.

As is illustrated by the correction filters shown in FIGS. 13 and 14, the layer 12 may extend either continuously below or above the layers 11. Such a structure has a simplifying effect upon the manufacturing process. The base is again indicated by the reference numeral 10.

The diagram in FIG. 15 shows the "spectral irradiance SB" as well as the "effective relative spectral irradiance" WRSB as utilized by the phosphors. SB and WRSB are plotted in nm over the wavelength λ.

From the spectrum of the light produced by a mercury vapor lamp of the type as customarily used for the irradiation, only the shortwave component reacts with the phosphor layer. The chemical reaction causing the adherence of the phosphor to the faceplate, is not assisted by the longwave component beyond the wavelength of 490 nm; this component only produces unnecessary heat which, in practical operation, has a disturbing effect when coating the faceplate, because long cooling times have a delaying effect upon the timing cycles of the production steps. In order to arrive at the desired production rate in spite of the foregoing, correspondingly more irradiation devices, id est so-called "lighthouses" have to be installed. Such an additional investment can be avoided when reducing the absorption in the correction filter by employing the invention. Within the effective waveband ranging between 320 and 490 nm, the barrier layer can act as the reflection layer which, however, permits the passage of radiation above 490 nm which has no effect upon the phosphor. Accordingly, there is only reflected the chemically effective spectral region (cold light reflector principle).

According to the invention, the surface areas of the correction filter which are not provided with the barrier layer are coated with a layer 12 reducing the radiation reflection thereof. For example, within the effective waveband ranging between 320 and 490 nm the transmittance is increased as far as possible. For wavelengths beyond 490 nm, the reflection may also add towards minimizing the absorption. This is accomplished by the optical antireflection coating by way of vapor deposition as is known from the fields of optical instruments.

The useful effect resulting from the employment of the invention firstly resides in a reduction of the exposure time, because owing to the optical antireflection coating, by maintaining the same heating of the correction filter, more radiation (light) is permitted to impinge upon the phosphor layer and, secondly, in a reduction of the cooling time, because owing to a reduced absorption as the result of an improved reflection, less heat is produced in the correction filter.

Experiments have shown that as the cooling time, when the invention is employed, there is only required a small portion of the radiation time, whereas in cases where conventional correction filters are used, the ratio of cooling time to irradiation time is at about 1:1.

I claim:

1. In a correction filter for a lighthouse for use in connection with the manufacture of color picture tubes, with one surface thereof having portions provided with a barrier layer having a defined pattern and with remaining surface portions thereof which are not provided with the barrier layer permitting the passage of light, the improvement comprising said surface portions which are not provided with the barrier layer are coated with a layer reducing the reflection of radiation and said surface portions which are provided as a barrier layer are coated with a layer increasing the radiation reflection.

2. A correction filter as claimed in claim 1, wherein the layer reducing the radiation reflection and the layer increasing the radiation reflection consist of materials which either permit or prohibit the passage of certain wave bands of the radiation, with these layers being designed as thin-film layers and their layer thicknesses being dimensioned to either prohibit or permit the passage of these wave bands.

3. A correction filter as claimed in claim 1, wherein the barrier layer consists of a material not permitting the passage of radiation and that the layer reducing the radiation reflection consists of a material permitting the passage of radiation, with the layer thicknesses being dimensioned to effect a minimum reflection of certain wave bands.

4. A correction filter as claimed in claim 3, wherein the layer reducing the radiation reflection and consisting of a material permitting the passage of radiation, also extends over or below the barrier layers.

5. A correction filter as claimed in claim 1, wherein the layer reducing the radiation reflection and the barrier layer consist of several coatings.

6. A correction filter as claimed in claim 5, wherein the individual coatings of the barrier layer have such thicknesses that a blocking will result in the wave band of the employed radiation owing to the maximum reflection.

7. A correction filter as claimed in claim 5, wherein the coatings of the layer reducing the radiation reflection, have such thicknesses that, in the wave band of the employed radiation, there will result an improved permeability owing to the reduced reflection.

8. A correction filter as claimed in claim 5, wherein the layer reducing the radiation reflection, are enlarged to form a closed surface on which the barrier layer are arranged.

9. A correction filter as claimed in claim 5, wherein the layer reducing the radiation reflection are enlarged to form a closed surface which also extends over the barrier layer.

10. A correction filter as claimed in claim 1, wherein the layer reducing the radiation reflection and the barrier layer and/or the individual coatings thereof consist of materials having different refractive indices.

* * * * *